United States Patent
Lee et al.

(10) Patent No.: US 8,224,706 B2
(45) Date of Patent: Jul. 17, 2012

(54) COMMODITY INFORMATION REGISTERING METHOD AND SYSTEM WHICH AUTOMATICALLY MATCHES COMMODITY MODEL AND CATEGORY WITH THE COMMODITY INFORMATION

(75) Inventors: Hyang Cheol Lee, Seoul (KR); Joon Hyock Moon, Seoul (KR); Bum Joo Park, Seoul (KR); Byoung Hoon Choi, Gyeonggi-do (KR)

(73) Assignee: NHHN Business Platform Corporation, Seongnam-si (KR)

( * ) Notice: Subject to any disclaimer, the term of this patent is extended or adjusted under 35 U.S.C. 154(b) by 1257 days.

(21) Appl. No.: 11/914,610

(22) PCT Filed: May 18, 2006

(86) PCT No.: PCT/KR2006/001857
§ 371 (c)(1),
(2), (4) Date: Nov. 16, 2007

(87) PCT Pub. No.: WO2006/123901
PCT Pub. Date: Nov. 23, 2006

(65) Prior Publication Data
US 2008/0167974 A1 Jul. 10, 2008

(30) Foreign Application Priority Data
May 19, 2005 (KR) .......................... 10-2005-0042132

(51) Int. Cl.
*G06Q 30/00* (2006.01)

(52) U.S. Cl. ...................................................... 705/26.1
(58) Field of Classification Search ................. 705/26.1
See application file for complete search history.

(56) References Cited

U.S. PATENT DOCUMENTS
2005/0038694 A1* 2/2005 Kobara et al. .................. 705/10

FOREIGN PATENT DOCUMENTS
| KR | 2003-0045670 | 6/2003 |
| KR | 10-2004-0021789 | 3/2004 |
| KR | 10-2005-0013447 | 2/2005 |
| KR | 10-0487276 | 4/2005 |

* cited by examiner

*Primary Examiner* — Mila Airapetian
(74) *Attorney, Agent, or Firm* — H.C. Park & Associates, PLC

(57) ABSTRACT

A goods information registration method includes: maintaining a goods model database including a goods model identifier which is used in a predetermined shopping mall relay server; receiving a goods identifier or a goods name of goods information which is registered in a predetermined shopping mall server; extracting a model name keyword from the goods name; using the model name keyword for searching the goods model database for at least one recommendation goods model identifier corresponding to the goods identifier, based on a predetermined automatic goods model recommendation logic; presenting search results including a list of the at least one recommendation goods model identifier to a goods registrant, and receiving a selection on any one recommendation goods model identifier of the list, from the goods registrant; and registering the goods information in the shopping mall relay server, in association with the selected recommendation goods model identifier.

16 Claims, 8 Drawing Sheets

GOODS INFORMATION REGISTRATION SYSTEM

GOODS INFORMATION
REGISTRATION SYSTEM

FIG. 3

| GOODS MODEL IDENTIFIER(301) | CATEGORY IDENTIFIER(302) | SEARCH FIELD(303) |
|---|---|---|
| KTF-X5500 | ELECTRONICS/MOBILE PHONES> MOBILE PHONES/PDAS/NAVIGATIONS > MOBILE PHONES | .... ....<br><br><brand>KTF EVER</brand><br><model>KTF-X5500</model><br><item>MOBILE PHONE</item><br><br>.... ....<br><br><keyword>KTF</keyword><br><keyword>SONGHAEGYOPHONE</keyword><br><keyword>DJPHONE</keyword><br><br>.... .... |
| .... .... | .... .... | .... .... |

FIG. 5

| | NAVER KNOWLEDGE SHOPPING | | | | | | | |
|---|---|---|---|---|---|---|---|---|
| GOODS REGISTRATION TOOL | | | | | | | | |

INFORMATION REGISTERED TO GMARKET
CATEGORY NAME: ELECTRONICS/HOME LIVINGS/DIGITAL CAMERAS/
OPTICAL ZOOM DIGITAL CAMERAS ～501
GOODS NAME: HOT HOME SHOPPING GOODS SONY W-1 AT LOWEST PRICE,
BEST PRESENT FOR ENTRANCE TO SCHOOL

| | IMAGE | MANUFACTURER | BRAND | GOODS NAME | GOODS TYPE | SPEC | LOWEST PRICE | HIGHEST PRICE |
|---|---|---|---|---|---|---|---|---|
| ☐ | | SONY | CYBERSHOT | DSC-W1 | DICA | 2.5"LCD, 32MB, OPTICAL 3 ZOOM, MOVING PICTURES +RECORDING | 290,000 | 678,000 |
| ☑ | | SONY | CYBERSHOT | DSC-W1Z | DICA | 2.5"LCD, 32MB, OPTICAL 3 ZOOM, MOVING PICTURES +RECORDING, BLACK, MS/MSPRO | 394,000 | 849,000 |
| ☐ | | SONY | CYBERSHOT | DSC-W1 (BLACK) | DICA | 2.5"LCD, 32MB, OPTICAL 3 ZOOM, MOVING PICTURES +RECORDING | 300,000 | 654,000 |

～502

SEARCH: [          ] OK ～503

| RECOMMENDATION CATEGORY | MANUAL INPUT | ～505

☑ ELECTRONICS/IMAGES/DIGITAL CAMERAS/OPTICAL ZOOM CAMERAS
☐ ELECTRONICS/IMAGES/DIGITAL CAMERAS/ CAMERAS ～504
☐ ELECTRONICS/IMAGES/DIGITAL CAMERAS/CAMERA ACCESSORIES

KNOWLEDGE SHOPPING
GOODS REGISTRATION

FIG. 6

| SHOPPING MALL IDENTIFIER (601) | GOODS IDENTIFIER (602) | GOODS MODEL IDENTIFIER (603) | CATEGORY IDENTIFIER (604) |
|---|---|---|---|
| GS shop | phone_123a | KTF-X5500 | ELECTRONICS/MOBILE PHONES> MOBILE PHONES/PDAS/NAVIGATIONS > MOBILE PHONES |
| .... .... | .... .... | .... .... | .... .... |

COMMODITY INFORMATION REGISTERING METHOD AND SYSTEM WHICH AUTOMATICALLY MATCHES COMMODITY MODEL AND CATEGORY WITH THE COMMODITY INFORMATION

CROSS REFERENCE TO RELATED APPLICATIONS

This application is a U.S. National Phase Application of International Application PCT Application No. PCT/KR2006/001857 filed on May 18, 2006, which claims the benefit of priority from Korean Patent Application No. 10-2005-0042132 filed on May 19, 2005. The disclosures of International Application PCT Application No. PCT/KR2006/001857 and Korean Patent Application No. 10-2005-0042132 are incorporated herein by reference.

TECHNICAL FIELD

The present invention relates to a goods information registration method and system which can automatically recommend a goods registrant a goods model identifier/category identifier, which is used in a shopping mall relay server, according to an automatic goods model/category recommendation logic when the goods registrant registers goods in a shopping mall server, and can store the goods model identifier/category identifier selected by the goods registrant in a predetermined matching table, and when loading goods information from the shopping mall server, can automatically match a corresponding goods model/category of the goods information by referring to the matching table and also automatically register the goods information in the shopping mall relay server.

BACKGROUND ART

Generally, a shopping mall relay service indicates a service of informing a goods purchaser about shopping malls that enter a predetermined relay website via a contract with a service provider. Accordingly, various types of information may be provided to the goods purchaser by classifying and introducing goods which are being sold in the shopping malls into each category or by comparing prices for each shopping mall with respect to identical goods.

The shopping mall relay service introduces goods of the shopping malls to the goods purchaser using various methods. When the goods purchaser selects particular goods which are being sold at a particular shopping mall, the shopping mall relay service connects the goods purchaser and the selected shopping mall, so that substantial sales of the goods may be completed in the affiliated shopping mall.

Goods information which is registered in each shopping mall must be registered in the shopping mall relay server for the shopping mall relay service. In a conventional art, goods registration procedures must be performed, the procedures including: 1) registering goods information of goods that a goods registrant desires to sell in a shopping mall server, 2) transmitting the registered goods information from the shopping mall server to a shopping mall relay server, 3) a department section in charge of the shopping mall relay server, matching and arranging a goods model name of the transmitted goods information and a corresponding category through a manual operation, and 4) registering the arranged goods information in the shopping mall relay server.

Accordingly, a great amount of time is spent for the goods registration/matching according to the conventional art. Also, a limit of operation resources exists. As an example, a ratio of unprocessed goods information may exceed the ratio of the registered goods information.

Also, as a marketplace area is expanded, a continuous increase in goods is expected. Accordingly, when following the conventional goods registration procedure, the limit of operation resources may become more severe.

DISCLOSURE OF INVENTION

Technical Goals

The present invention provides a goods information registration method and system which can automatically register goods information in a shopping mall relay server by automatically recommending a goods registrant a goods model identifier/category identifier, which is used in the shopping mall relay server, according to an automatic goods model/category recommendation logic, and automatically matching the goods model identifier/category identifier selected by the goods registrant and a corresponding goods model/category of the goods information.

The present invention also provides a goods information registration method and system which can automate goods registration/matching operations when registering goods information in a shopping mall relay server, and thereby, significantly reduce limitation of the operation resources.

The present invention also provides a goods information registration method and system which can pre-perform goods registration/matching, when a goods registrant registers goods in a shopping mall server, by accurately analyzing a goods name that the goods registrant input in the shopping mall server, extracting an appropriate keyword and automatically recommending a goods model name and a category corresponding to the goods via the extracted keyword, and also does not require another manual operation for the goods registration/matching when registering the goods in a shopping mall relay server.

Technical Solutions

According to an aspect of the present invention, there is provided a goods information registration method including: maintaining a goods model database including a goods model identifier which is used in a predetermined shopping mall relay server; receiving a goods identifier or a goods name of goods information which is registered in a predetermined shopping mall server; extracting a model name keyword from the goods name; using the model name keyword for searching the goods model database for at least one recommendation goods model identifier corresponding to the goods identifier, based on a predetermined automatic goods model recommendation logic; presenting search results including a list of the at least one recommendation goods model identifier to a goods registrant, and receiving a selection on any one recommendation goods model identifier of the list, from the goods registrant; and registering the goods information in the shopping mall relay server, in association with the selected recommendation goods model identifier.

According to another aspect of the present invention, the goods information registration method further includes storing the goods identifier in a predetermined matching table, in correspondence to the selected recommendation goods model identifier, wherein the registering of the goods information comprises: loading the goods information from the shopping mall server; identifying the recommendation goods model identifier corresponding to the goods identifier of the goods information, from the matching table; and automatically matching the goods information with the identified recommendation goods model identifier, and registering the matched goods information in the shopping mall relay server.

According to still another aspect of the present invention, there is provided a goods information registration method further including: maintaining a category database including a category identifier which is used in the shopping mall relay server; searching the category database for at least one recommendation category identifier corresponding to the goods identifier; presenting search results including a list of the at least one recommendation category identifier to the goods registrant, and receiving a selection on any one recommendation category identifier of the list, from the goods registrant; and registering the goods information in the shopping mall relay server in association with the selected recommendation category identifier.

According to yet another aspect of the present invention, there is provided a goods information registration system including: a goods model database including a goods model identifier which is used in a predetermined shopping mall relay server; a first receiving unit receiving a goods identifier or a goods name of goods information which is registered in a predetermined shopping mall server; an extraction unit extracting a model name keyword from the goods name; a search unit using the model name keyword for searching the goods model database for at least one recommendation goods model identifier corresponding to the goods identifier, based on a predetermined automatic goods model recommendation logic; a presentation unit presenting search results including a list of the at least one recommendation goods model identifier to a goods registrant; a second receiving unit receiving a selection on any one recommendation goods model identifier of the list, from the goods registrant; and a registration unit registering the goods information in the shopping mall relay server, in association with the selected recommendation goods model identifier.

BRIEF DESCRIPTION OF DRAWINGS

FIG. 3 is a diagram illustrating an example of a goods model database according to an embodiment of the present invention;

FIG. 5 is a diagram illustrating an example of implementing an automatic goods model/category recommendation logic which is inserted into a goods registration tool of a shopping mall server, automatically recommending a goods model identifier/category identifier which is used in a shopping mall relay server and presenting the same to a goods registrant, according to an embodiment of the present invention;

FIG. 6 is a diagram illustrating an example of a matching table according to an embodiment of the present invention;

BEST MODE FOR CARRYING OUT THE INVENTION

Figure 1:
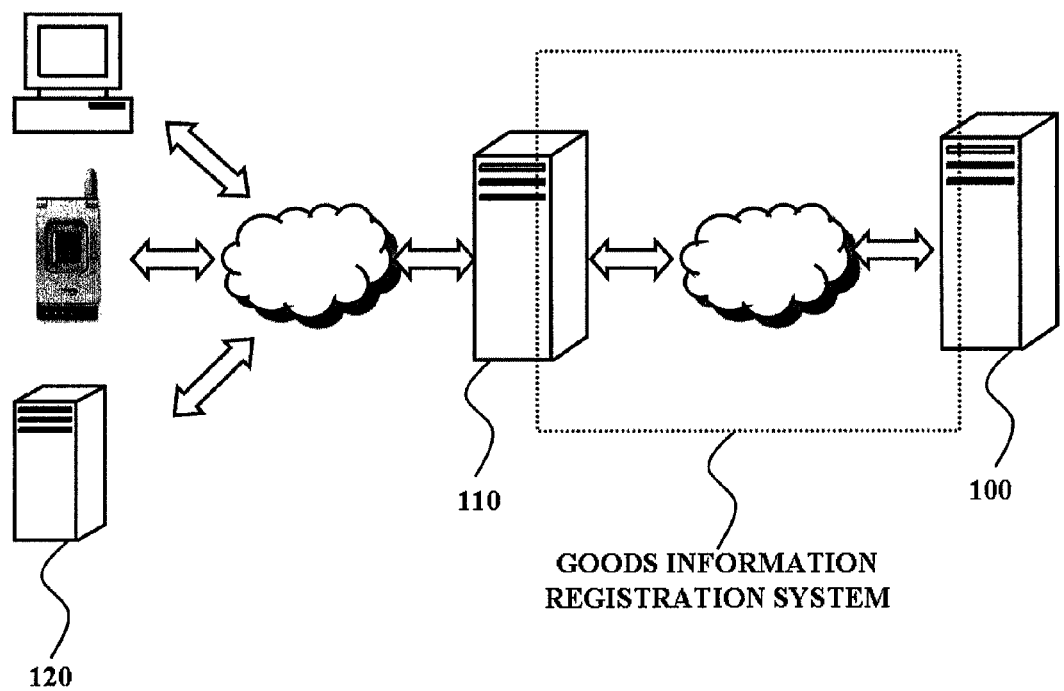
FIG. 1 is a diagram illustrating a network connection of a shopping mall relay server, a shopping mall server and a goods registrant according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a network connection of a shopping mall relay server 100, a shopping mall server 110 and a goods registrant 120 according to an embodiment of the present invention.

A goods information registration method according to the present invention may be performed by a predetermined goods information registration system. The goods information registration system may operate in both the shopping mall relay server 100 and the shopping mall server 110. Also, the goods information registration system may operate in any one of the shopping mall relay server 100 and the shopping mall server 110 and interoperate with a remaining server. Also, although not shown in FIG. 1, the goods information registration system may interoperate with the shopping mall relay server 100 and the shopping mall server 110 from a remote location.

Initially, the entire process of automatically matching a goods model identifier will be described.

The goods information registration system maintains a goods model database including a goods model identifier which is used in the shopping mall relay server 100, and receives a goods identifier or a goods name of goods information which is registered in the shopping mall server 110. Also, the goods information registration system extracts a model name keyword from the goods name, and searches the goods model database for at least one recommendation goods model identifier corresponding to the goods identifier by using the model name keyword and implementing a predetermined automatic goods model recommendation logic. Next, the goods information registration system presents search results including a list of the at least one recommendation goods model identifier to the goods registrant 120, and receives a selection on any one recommendation goods model identifier of the list, from the goods registrant 120. In this instance, the goods information registration system stores the goods identifier in a predetermined matching table, in correspondence to the selected recommendation goods model identifier.

After the above process, when loading the goods information from the shopping mall server 110, the goods information registration system identifies the recommendation goods model identifier corresponding to the goods identifier of the goods information, from the matching table, and automatically matches the goods information with the identified recommendation goods model identifier, and registers the matched goods information in the shopping mall relay server 100.

Next, the entire process of automatically matching a category identifier will be described.

The goods information registration system maintains a category database including a category identifier which is used in the shopping mall relay server 100, and receives a goods identifier or a category name of goods information which is registered in the shopping mall server 110. Also, the goods information registration system extracts a category keyword from the category name, and searches the category database for at least one recommendation category identifier corresponding to the goods identifier by using the category keyword and implementing a predetermined automatic category recommendation logic. Next, the goods information registration system presents search results including a list of the at least one recommendation category identifier to the goods registrant 120, and receives a selection on any one recommendation category identifier of the list, from the goods registrant 120. In this case, the goods information registration system stores the goods identifier in a predetermined matching table, in correspondence to the selected recommendation category identifier.

After the above process, when loading the goods information from the shopping mall server 110, the goods information registration system identifies the recommendation category identifier corresponding to the goods identifier of the goods information, from the matching table, and automatically matches the goods information with the identified recommendation category identifier, and registers the matched goods information in the shopping mall relay server 100.

The process of automatically matching the goods model identifier and the process of automatically matching the category identifier may be respectively performed by the goods information registration system, and also interoperated by the goods information registration system.

Figure 2:
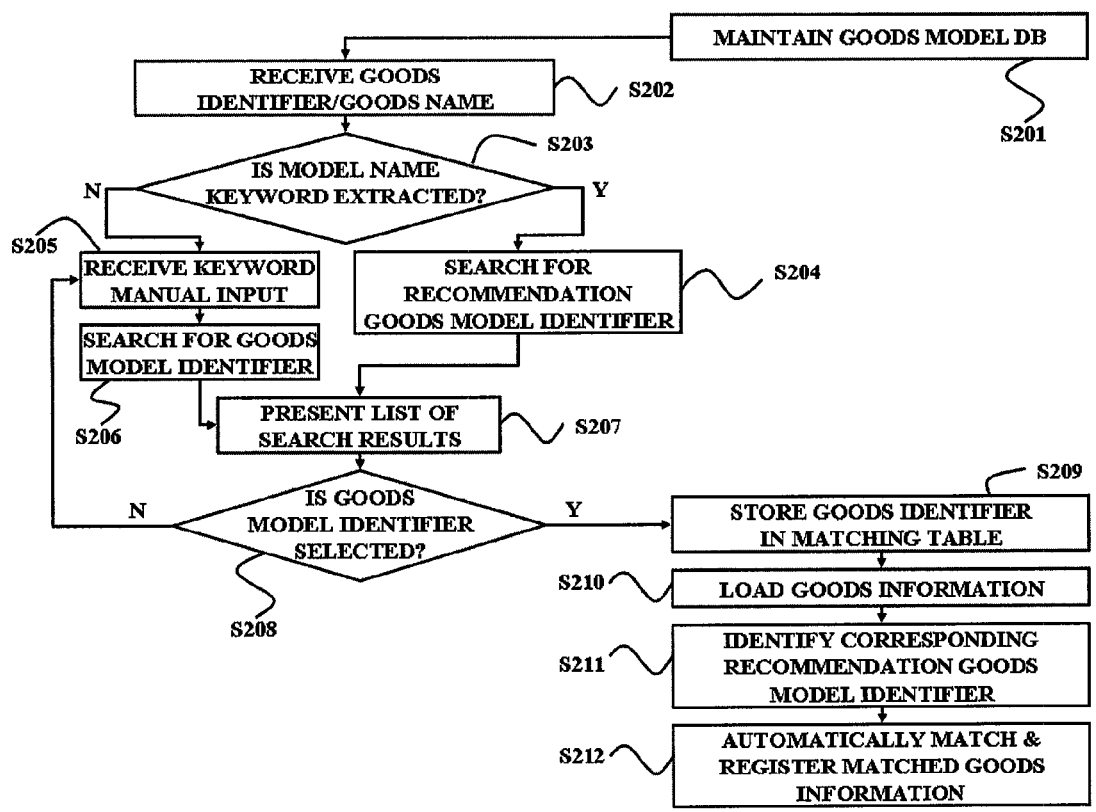
FIG. 2 is a flowchart illustrating a goods information registration method according to an embodiment of the present invention.

FIG. 2 is a flowchart illustrating a goods information registration method according to an embodiment of the present invention.

The goods information registration method according to the present embodiment may be performed by a predetermined goods information registration system. As described above, the goods information registration system may operate in a shopping mall relay server and a shopping mall server. Also, the goods information registration system may interoperate with the shopping mall relay server and the shopping mall server.

In operation S201, the goods information registration system maintains a goods model database. The goods model database includes a goods model identifier which is used in a predetermined shopping mall relay server.

FIG. 3 is a diagram illustrating an example of the goods model database.

As shown in FIG. 3, the goods model database may include a goods model identifier 301 which is used in the shopping mall relay server, a category identifier 302 for each goods model identifier 301, and a search field 303.

The goods model identifier 301 is utilized for identifying each goods model in the shopping mall relay server. The category identifier 302 is utilized for identifying a category of the each goods model which is classified in the shopping mall relay server according to a predetermined standard. The search field 303 is searched when searching for a recommendation goods model identifier using a model name keyword. In this instance, the search field 303 may include all types of information associated with the each goods model, e.g. a brand, a model name, an item name, a keyword, etc.

In FIG. 3, the category identifier 302 is recorded in the goods model database, as a separate data field from the search field 303. However, it is only an example and the present invention is not limited thereto. The category identifier 302 may be included in the search field 303.

In operation S202, the goods information registration system receives a goods identifier or a goods name of goods information which is registered in a predetermined shopping mall server.

The goods identifier of goods information is utilized for identifying each goods in the shopping mall server. A different goods identifier with respect to identical goods may be utilized in each shopping mall server. In this case, the different goods identifier may not be registered in the shopping mall relay server as is. Accordingly, in the case of identical goods, the shopping mall relay server is required to match the goods information with a single goods model identifier and register the matched goods information.

When the goods registrant requests the shopping mall server to register goods information of goods that the goods registrant desires to sell, the shopping mall server may issue a goods identifier with respect to the requested goods information, and thereby, generate the goods identifier. The goods information registration system may receive the goods identifier of the goods information which is registered in the shopping mall server.

Figure 4:
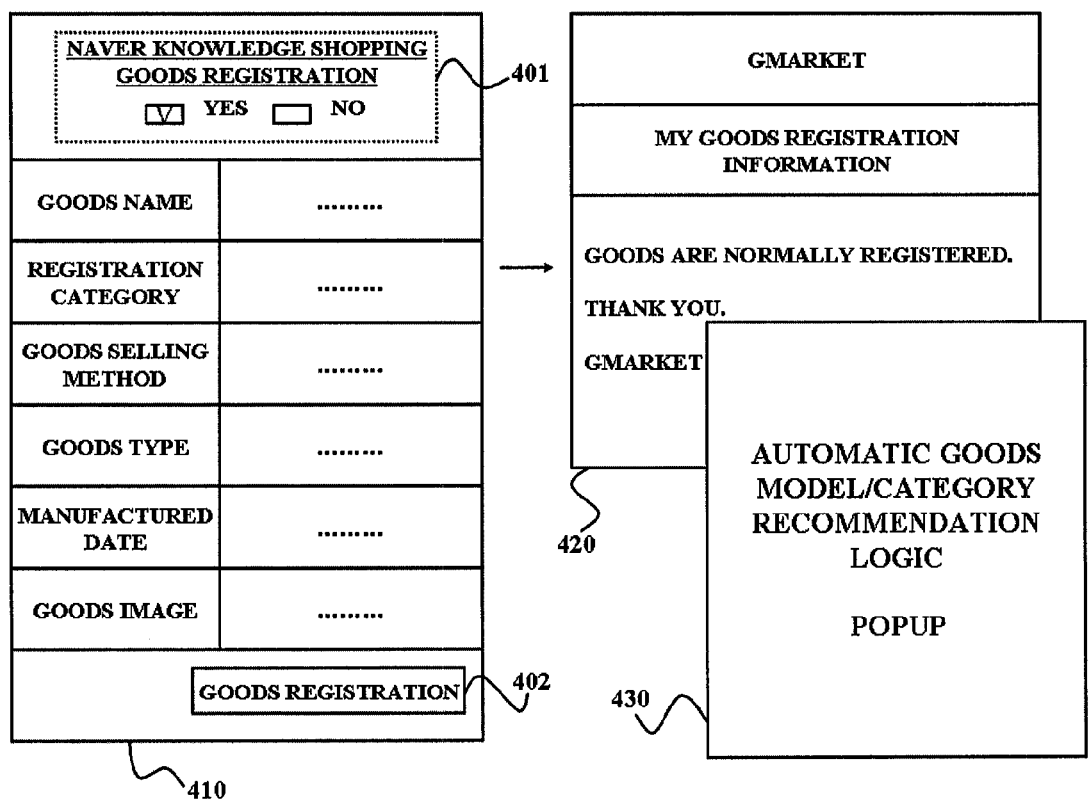
FIG. 4 is a diagram illustrating an example of a user interface which can be presented to a goods registrant who registers goods information in a shopping mall server, according to an embodiment of the present invention.

FIG. 4 is a diagram illustrating an example of a user interface which can be presented to a goods registrant who registers goods information in a shopping mall server, according to an embodiment of the present invention.

The goods registrant may input goods information via a user interface 410. Examples of the goods information include a goods name, a registration category, a goods selling method, a goods type, a manufactured date, a goods image, etc., with respect to goods that the goods registrant desires to sell in a shopping mall server. Also, the goods registrant may select whether to register the input goods information in the shopping mall relay server via a selection screen 401.

The goods registrant that input the goods information and selected whether to register the input goods information in the shopping mall relay server may click a 'goods registration' button 402 and thereby, request the shopping mall server to register the goods information. In this case, while issuing a predetermined goods identifier with respect to the input goods information and registering the goods information in the shopping mall server, the shopping mall server may provide the goods registrant with a registration completion screen 420.

Also, when the goods registrant selects registration of the goods information in the shopping mall relay server via the goods registration button 402 and the goods information registration is completed, the goods information registration system receives the goods identifier and the goods name of the goods information which is registered in the shopping mall server, implements a predetermined automatic goods model recommendation logic, and presents a goods model recommendation screen 430 for the goods registrant. In this case, the goods model recommendation screen 430 may be provided in a form of a pop-up window with respect to the registration completion screen 420.

FIG. 5 is a diagram illustrating an example of implementing an automatic goods model/category recommendation logic which is inserted into a goods registration tool of a shopping mall server, automatically recommending a goods model identifier/category identifier which is used in a shopping mall relay server and presenting the same to a goods registrant, according to an embodiment of the present invention. As an example, the goods model recommendation screen 430 may be provided in a form of the goods registration tool shown in FIG. 5.

In operation S203, the goods information registration system extracts a model name keyword from the goods name, using the goods name of the goods information which is registered in the shopping mall server. Referring to FIG. 5, the goods information registration system may receive a goods name such as that shown by a reference number 501, from the goods information which is registered in the shopping mall server, and extract the model name keyword from the goods name.

As an example, as indicated by the reference number 501, when the goods name is "hot home shopping goods SONY W-1 at lowest price, best present for entrance to school", the goods information registration system may extract a model name keyword, "W-1" which includes an English letter and a number, from the goods name.

In operation S204, the goods information registration system uses the model name keyword and searches the goods model database for at least one recommendation goods model identifier corresponding to the goods identifier, based on a predetermined automatic goods model recommendation logic.

As an example, the goods information registration system may identify a goods model identifier corresponding to a search field, which includes an item matching the extracted "W-1", by searching the search field of the goods model database.

In operation S207, the goods information registration system presents search results to the goods registrant. In this instance, the search results include a list of the at least one recommendation goods model identifier.

As an example, referring to FIG. 5, the goods information registration system may present search results including a list of goods model identifiers as indicated by a reference number 502, to the goods registrant. Referring to the reference number 502, the goods information registration system retrieves recommendation goods model identifiers, such as "DSC-W1", "DSC-W12" and "DSC-W1(black)", using the model name keyword "W-1", and presents the retrieved recommendation goods model identifiers to the goods registrant, as search results.

In operation S208, the goods information registration system receives a selection on any one recommendation goods model identifier of the list, from the goods registrant. As an example, in FIG. 5, "DSC-W12" is selected by the goods registrant.

Although an example that the model name keyword is extracted from the goods name in operation S203 has been described above, the search may be manually performed in operations S205 and S206, when the model name keyword is not extracted from the goods name due to special circumstances in operation S203, when a selection on a keyword manual input is received from the goods registrant, or when a selection on the recommendation goods model identifier is not received from the goods registrant in operation S208.

In operation S205, the goods information registration system manually receives a keyword for searching for the goods model identifier, from the goods registrant. As an example, the goods information registrant system may manually receive the keyword from the goods registrant via a search window as indicated by a reference number 503 of FIG. 5.

Also, in this case, in operation S206, the goods information registration system searches the goods model database for at least one goods model identifier corresponding to the goods identifier, using the input keyword. In operation S207, the goods information registration system presents a list of the at least one goods model identifier to the goods registrant. In operation S208, the goods information registration system may receive a selection on any one goods model identifier of the list, from the goods registrant.

Hereinafter, a process of automatically matching goods information with a goods model identifier selected by the goods registrant and registering the matched goods information in the shopping mall relay server will be described.

In operation S209, the goods information registration system stores the goods identifier, which is used in the shopping mall server, in a predetermined matching table in correspondence to the selected recommendation goods model identifier.

FIG. 6 is a diagram illustrating an example of the matching table. As shown in FIG. 6, the matching table may include a shopping mall identifier 601, a goods identifier 602, a goods model identifier 603, and a category identifier 604.

The shopping mall identifier 601 is utilized for identifying each shopping mall server which provides goods information. The shopping mall identifier 601 may be received with the goods identifier 602 in operation S202. In this instance, the goods identifier 602 is utilized for identifying each goods in the each shopping mall server, and issued with respect to goods information whose registration is requested.

Also, the goods model identifier 603 is utilized for identifying the each goods model in the shopping mall relay server which intermediates a plurality of shopping malls. The category identifier 604 is utilized for identifying a category of the each goods model which is classified in the shopping mall relay server according to a predetermined standard.

As an example, referring to FIG. 6, the goods identifier 602 "phone_123a" of goods information, which is registered in the shopping mall server with the shopping mall identifier 601 "Gshop", may be stored in a matching table in correspondence to the goods model identifier 603, "KTF-X5500", which is used in the shopping mall relay server, and the category identifier 604, "electronics/mobile phones>mobile phones/PDAs/navigations>mobile phones".

In operation S210, the goods information registration system loads the goods information from the shopping mall server. In this case, in operation S211, the goods information registration system identifies the recommendation goods model identifier corresponding to the goods identifier of the goods information, from the matching table, by referring to the matching table.

As an example, referring to FIG. 6, when loading goods information with the goods identifier 602 "phone_123a" from the shopping mall server with the shopping mall identifier 601 "Gshop" in operation S210, the goods information registration system may identify "KTF-X5500" for the goods model identifier 603 of the shopping mall relay server corresponding to the goods identifier 602 "phone_123a" by referring to the matching table in operation S211. Also, in operation S211, the goods information registration system may identify "electronics/mobile phones>mobile phones/PDAs/navigations>mobile phones" for the category identifier 604 of the shopping mall relay server.

In operation S212, the goods information registration system automatically matches the goods information with the identified recommendation goods model identifier, and registers the matched goods information in the shopping mall relay server. In this case, the goods information registration system may register the goods information in the shopping mall relay server by automatically matching the goods information with the identified recommendation goods model identifier and the identifier category identifier.

An embodiment of automatically registering goods information which is loaded from a shopping mall server to a shopping mall relay server by matching a goods model identifier of the shopping mall relay server with a goods identifier of the shopping mall server has been described above. Hereinafter, another embodiment of automatically registering goods information which is loaded from a shopping mall server to a shopping mall relay server by matching a category identifier of the shopping mall server with a goods identifier of the shopping mall server will be described. The embodiments may be respectively performed by the goods information registration system according to the present invention, or interoperate with the goods information registration system.

Figure 7:
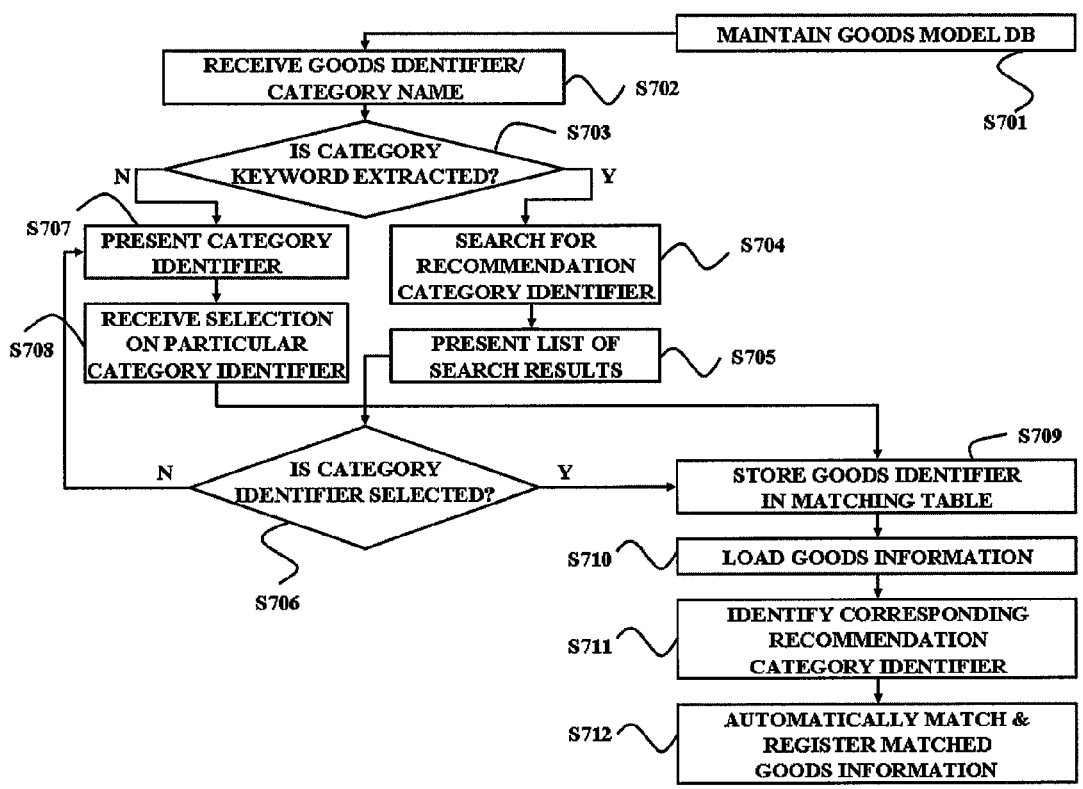
FIG. 7 is a flowchart illustrating a goods information registration method according to another embodiment of the present invention.

FIG. 7 is a flowchart illustrating a goods information registration method according to another embodiment of the present invention.

The goods information registration method according to the present embodiment may be performed by a predetermined goods information registration system. As described above, the goods information registration system may operate in a shopping mall relay server and a shopping mall server. Also, the goods information registration system may interoperate with the shopping mall relay server and the shopping mall server.

In operation S701, the goods information registration system maintains a category database. The category database includes a category identifier which is used in a predetermined shopping mall relay server. In this instance, the category database may be constructed to be similar to or identical to that shown in FIG. 3, and detailed description related thereto will be omitted.

In operation S702, the goods information registration system receives a goods identifier or a category name of goods information which is registered in a predetermined shopping mall server.

The goods identifier of goods information is utilized for identifying each goods in the shopping mall server. A different goods identifier with respect to identical goods may be utilized in each shopping mall server. In this case, the different goods identifier may not be registered in the shopping mall relay server as is. Accordingly, in the case of identical goods, the shopping mall relay server is required to match the goods information with a single category identifier and register the matched goods information.

Referring to FIG. 4, when the goods registrant selects registration of the goods information in the shopping mall relay server via the selection screen 401 and the goods information registration is completed, the goods information registration system receives the goods identifier and the category name of the goods information which is registered in the shopping mall server, implements a predetermined automatic category recommendation logic, and presents a category recommendation screen 430 for the goods registrant. In this case, the category recommendation screen 430 may be provided in a form of a pop-up window with respect to the registration completion screen 420.

In this instance, the recommendation screen 430 may be any one of the goods model recommendation screen and the category recommendation screen. Also, the goods model recommendation and the category recommendation may be performed on one recommendation screen 430.

FIG. 5 is a diagram illustrating an example of implementing an automatic goods model/category recommendation logic which is inserted into a goods registration tool of a shopping mall server, automatically recommending a goods model identifier/category identifier which is used in a shopping mall relay server and presenting the same to a goods registrant, according to an embodiment of the present invention. As an example, the category recommendation screen 430 may be provided in a form of the goods registration tool shown in FIG. 5.

In operation S703, the goods information registration system extracts a category keyword from the category name, using the category name of the goods information which is registered in the shopping mall server. Referring to FIG. 5, the goods information registration system may receive a category name such as that shown by the reference number 501, from the goods information which is registered in the shopping mall server, and extract the category keyword from the category name.

As an example, as indicated by the reference number 501, when the category name is "electronics/home livings/digital cameras/optical zoom digital cameras", the goods information registration system may extract a category keyword such as "electronics", "home livings", "digital cameras" and "optical zoom".

In operation S704, the goods information registration system uses the category keyword and searches the category database for at least one recommendation category identifier corresponding to the goods identifier, based on a predetermined automatic category recommendation logic.

As an example, the goods information registration system may identify a category identifier corresponding to a search field, which includes an item matching the extracted "electronics", "home livings", "digital cameras" or "optical zoom", by searching the search field of the category database.

In operation S705, the goods information registration system presents search results to the goods registrant. In this instance, the search results include a list of the at least one recommendation category identifier.

As an example, referring to FIG. 5, the goods information registration system may present search results including a list of category identifiers as indicated by a reference number 504, to the goods registrant. Referring to the reference number 504, the goods information registration system retrieves recommendation category identifiers, such as "electronics/images/digital cameras/optical zoom cameras", "electronics/images/digital cameras/cameras" and "electronics/images/digital cameras/camera accessories", using the category keyword such as "electronics", "home livings", "digital cameras" or "optical zoom" and presents the retrieved recommendation category identifiers to the goods registrant, as search results.

In operation S706, the goods information registration system receives a selection on any one recommendation category identifier of the list, from the goods registrant. As an example, in FIG. 5, "electronics/images/digital cameras/optical zoom cameras" is selected by the goods registrant.

Although an example that the category keyword is extracted from the goods name in operation S703 has been described above, the search may be manually performed in operations S707 and S708, when the category keyword is not extracted from the category name due to special circumstances in operation S703, when a selection on a category manual input is received from the goods registrant, or when a selection on the recommendation category identifier is not received from the goods registrant in operation S706.

In operation S707, the goods information registration system presents the category identifier included in the category database, to the goods registrant. As an example, when a 'manual input' button 505 of FIG. 5 is clicked by the goods registrant, the goods information registration system may present the category identifier included in the category database, to the goods registrant.

In operation S708, the goods information registration system may receive a selection on a particular category identifier from the presented category identifiers, from the goods registrant.

Hereinafter, a process of registering goods information in the shopping mall relay server by automatically matching the goods information with the category identifier selected by a goods registrant will be described.

In operation S709, the goods information registration system stores the goods identifier which is used in the shopping mall server, in a predetermined matching table, in correspondence to the selected recommendation category identifier. FIG. 6 is a diagram illustrating an example of the matching table, which has been described above. Accordingly, further detailed description related thereto will be omitted.

In operation S710, the goods information registration system loads the goods information from the shopping mall server. In this case, in operation S711, the goods information registration system identifies the recommendation category identifier corresponding to the goods identifier of the goods information, from the matching table, by referring to the matching table.

In operation S712, the goods information registration system automatically matches the goods information with the identified recommendation category identifier, and registers the matched goods information in the shopping mall relay server.

The goods information registration method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 8:
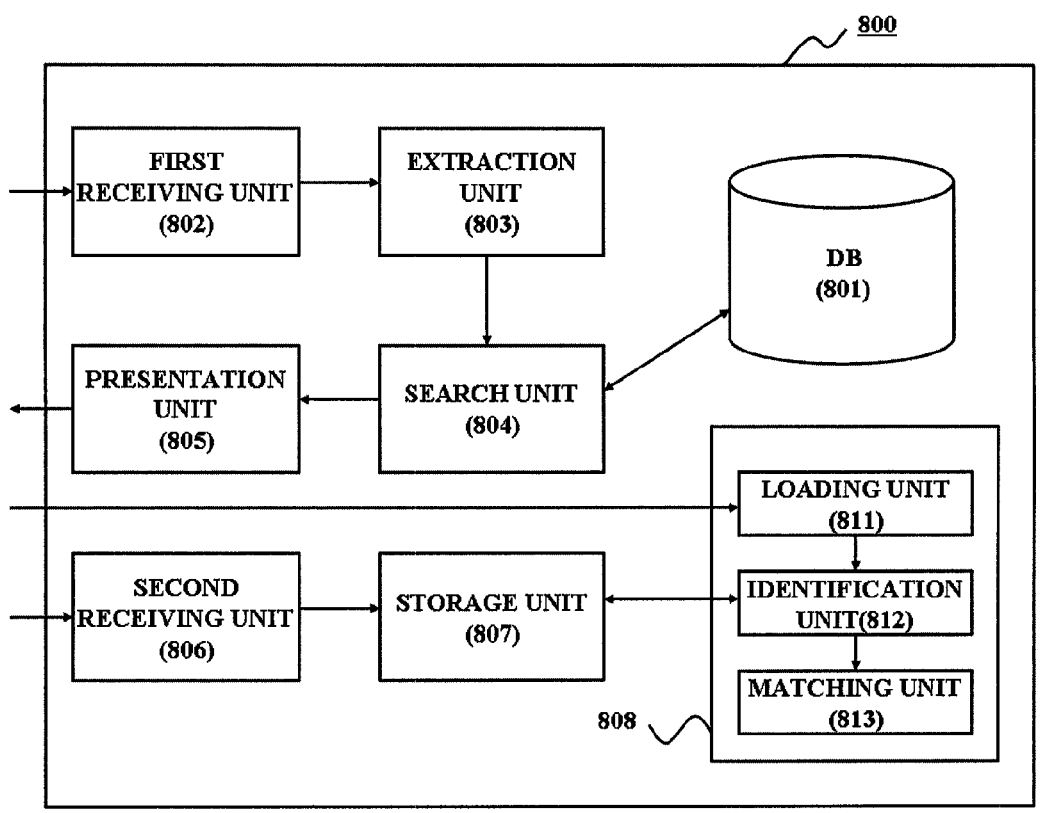
FIG. 8 is a block diagram illustrating a configuration of a goods information registration system according to an embodiment of the present invention.

FIG. 8 is a block diagram illustrating a configuration of a goods information registration system 800 according to an embodiment of the present invention.

Initially, an embodiment of recommending a goods model identifier, matching goods information with the goods model identifier, and registering the matched goods information in a shopping mall relay server will be described.

The goods information registration system 800 according to the present invention may include a database 801, a first receiving unit 802, an extraction unit 803, a search unit 804, a presentation unit 805, a second receiving unit 806, a storage unit 807, and a registration unit 808. In this instance, the registration unit 808 may include a loading unit 811, an identification unit 812, and a matching unit 813.

In the present embodiment, the database 801 is a goods model database, and includes a goods model identifier which is used in a predetermined shopping mall relay server. FIG. 3 is a diagram illustrating an example of the database 801, which has been described above.

The first receiving unit 802 receives a goods identifier or a goods name of goods information which is registered in a predetermined shopping mall server. The extraction unit 803 extracts a model name keyword from the goods name, using the goods name of the goods information which is registered in the shopping mall server.

Referring to FIG. 5, the first receiving unit 802 may receive the goods name as indicated by the reference number 501, from the goods information registered in the shopping mall server. The extraction unit 803 may extract the model name keyword from the goods name. As an example, as indicated by the reference number 501, when the goods name is "hot home shopping goods SONY W-1 at lowest price, best present for entrance to school", the extraction unit 803 may extract a model name keyword, "W-1" which includes an English letter and a number, from the goods name.

The search unit 804 uses the model name keyword and searches the database 801 for at least one recommendation goods model identifier corresponding to the goods identifier, based on a predetermined automatic goods model recommendation logic. As an example, the search unit 804 may identify a goods model identifier corresponding to a search field, which includes an item matching the extracted "W-1", by searching the search field of the database 801.

The presentation unit 805 presents search results to the goods registrant. In this instance, the search results include a list of the at least one recommendation goods model identifier. As an example, referring to FIG. 5, the presentation unit 805 may present search results including a list of goods model identifiers as indicated by the reference number 502, to the goods registrant. Referring to the reference number 502, the presentation unit 805 retrieves recommendation goods model identifiers, such as "DSC-W1", "DSC-W12" and "DSC-W1 (black)", using the model name keyword "W-1", and presents the retrieved recommendation goods model identifiers to the goods registrant, as search results.

The second receiving unit 806 receives a selection on any one recommendation goods model identifier of the list, from the goods registrant. As an example, in FIG. 5, "DSC-W12" is selected by the goods registrant.

The storage unit 807 stores the goods identifier which is used in the shopping mall server, in a predetermined matching table, in correspondence to the selected recommendation goods model identifier. FIG. 6 is a diagram illustrating an example of the matching table, which has been described above.

The registration unit 808 functions to register the goods information in the shopping mall relay server in association with the selected recommendation goods model identifier. The registration unit 808 may include the loading unit 811, the identification unit 812, and the matching unit 813.

The loading unit 811 loads the goods information from the shopping mall server. In this case, the identification unit 812 identifies the recommendation goods model identifier corresponding to the goods identifier of the goods information, from the matching table, by referring to the matching table.

As an example, referring to FIG. 6, when the loading unit 811 loads goods information with the goods identifier 602 "phone_123a" from the shopping mall server with the shopping mall identifier 601 "Gshop" in operation S210, the identification unit 812 may identify "KTF-X5500" for the goods model identifier 603 of the shopping mall relay server corresponding to the goods identifier 602 "phone_123a" by referring to the matching table in operation S211. Also, in operation S211, the identification unit 812 may identify "electronics/mobile phones>mobile phones/PDAs/navigations >mobile phones" for the category identifier 604 of the shopping mall relay server.

The matching unit 813 automatically matches the goods information with the identified recommendation goods model identifier, and registers the matched goods information in the shopping mall relay server. In this case, the matching unit 813 may register the goods information in the shopping mall relay server by automatically matching the goods information with the identified recommendation goods model identifier and the identifier category identifier.

Next, an embodiment of recommending a category identifier, matching goods information with the category identifier and registering the matched goods information in a shopping mall relay server will be described.

As described above, the goods information registration system 800 according to the present embodiment may include a database 801, a first receiving unit 802, an extraction unit 803, a search unit 804, a presentation unit 805, a second receiving unit 806, a storage unit 807, and a registration unit 808. In this instance, the registration unit 808 may include a loading unit 811, an identification unit 812, and a matching unit 813.

In the present embodiment, the database 801 is a category database, and includes a category identifier which is used in a predetermined shopping mall relay server. The database 801 may be constructed to be the same as or similar to that shown in FIG. 3, which has been described above. Accordingly, detailed description related thereto will be omitted.

The first receiving unit 802 receives a goods identifier or a category name of goods information which is registered in a predetermined shopping mall server. The extraction unit 803 extracts a category keyword from the category name, using the category name of the goods information which is registered in the shopping mall server.

Referring to FIG. 5, the first receiving unit 802 may receive a category name such as the category name shown by the reference number 501, from the goods information which is registered in the shopping mall server. The extraction unit 803 may extract the category keyword from the category name. As an example, as indicated by the reference number 501, when the category name is "electronics/home livings/digital cameras/optical zoom digital cameras", the extraction unit 803 may extract category keywords such as "electronics", "home livings", "digital cameras" and "optical zoom".

The search unit 804 uses the category keyword and searches the database 801 for at least one recommendation category identifier corresponding to the goods identifier, based on a predetermined automatic category recommendation logic. As an example, the search unit 804 may identify a category identifier corresponding to a search field, which includes an item matching the extracted "electronics", "home livings", "digital cameras" or "optical zoom", by searching the search field of the database 801.

The presentation unit 805 presents search results to the goods registrant. In this instance, the search results include a list of the at least one recommendation category identifier. As an example, referring to FIG. 5, the presentation unit 805 may present search results including a list of category identifiers as indicated by the reference number 504, to the goods registrant. Referring to the reference number 504, the presentation unit presents the recommendation category identifiers to the goods registrant, as search results. In this instance, the recommendation category identifiers, such as "electronics/images/digital cameras/optical zoom cameras", "electronics/images/digital cameras/cameras" and "electronics/images/digital cameras/camera accessories", are retrieved by using the category keyword such as "electronics", "home livings", "digital cameras" or "optical zoom".

The second receiving unit 806 receives a selection on any one recommendation category identifier of the list, from the goods registrant. As an example, in FIG. 5, "electronics/images/digital cameras/optical zoom cameras" is selected by the goods registrant.

The storage unit 807 stores the goods identifier which is used in the shopping mall server, in a predetermined matching table, in correspondence to the selected recommendation category identifier. FIG. 6 is a diagram illustrating an example of the matching table, which has been described above.

The registration unit 808 functions to register the goods information in the shopping mall relay server in association with the selected recommendation category identifier. The registration unit 808 may include the loading unit 811, the identification unit 812 and the matching unit 813.

The loading unit 811 loads the goods information from the shopping mall server. In this case, the identification unit 812 identifies the recommendation category identifier corresponding to the goods identifier of the goods information, from the matching table, by referring to the matching table.

The matching unit 813 automatically matches the goods information with the identified recommendation category identifier, and registers the matched goods information in the shopping mall relay server.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

As used in this application, the term "unit" is intended to refer to, but is not limited to, a software or hardware component, which performs certain tasks. A unit or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

Industrial Applicability

According to the present invention, there is provided a goods information registration method and system which can automatically register goods information in a shopping mall relay server by automatically recommending a goods registrant a goods model identifier/category identifier, which is used in the shopping mall relay server, according to an automatic goods model/category recommendation logic, and automatically matching the goods model identifier/category identifier selected by the goods registrant and a corresponding goods model/category of the goods information.

Also, according to the present invention, there is provided a goods information registration method and system which can automate goods registration/matching operations when registering goods information in a shopping mall relay server, and thereby, significantly reduce limitation of the operation resources.

Also, according to the present invention, there is provided a goods information registration method and system which can pre-perform goods registration/matching, when a goods registrant registers goods in a shopping mall server, by accurately analyzing a goods name that the goods registrant input in the shopping mall server, extracting an appropriate keyword, and automatically recommending a goods model name and a category corresponding to the goods via the extracted keyword. In this instance, another manual operation for the goods registration/matching is not required when registering the goods in a shopping mall relay server.

The invention claimed is:

1. A computer-implemented method that uses a computer processor to register goods for online sale, comprising:
   receiving a request for registration of goods for online sale, the request being indicative of a goods identifier or a name of the goods to be sold using an online shopping server from a user;
   upon receipt of the request for registration, extracting a keyword in association with a model name of the goods from the goods name or the goods identifier;
   searching, using the computer processor, a goods model database by using the extracted keyword for at least one recommended model identifier corresponding to the goods identifier or the goods name, wherein the goods model database comprises a plurality of model identifiers in association with a plurality of goods identifiers; and
   providing the user with a list of recommended model identifiers based, at least in part, upon the searched recommended model identifier so that the user uses the provided list of the recommended model identifiers for their selection of a model identifier.

2. The method of claim 1, further comprising:
   upon the user's selection of a model identifier, automatically correlating the received goods identifier to the selected model identifier.

3. The method of claim 1, further comprising:
   receiving a keyword for searching for a goods model identifier, from the user through the user's manual input of the keyword;
   searching the goods model database for at least one goods model identifier corresponding to the goods identifier, by using the received keyword; and
   providing the user with search results including a list of goods model identifiers based, at least in part, upon the searched goods model identifier.

4. The method of claim 2, wherein the goods model database further comprises at least one category identifier in association with each of the plurality of goods model identifiers, and
   upon the user's selection of a model identifier, correlating the goods identifier to the selected model identifier and a category identifier associated with the selected model identifier.

5. The method of claim 1, further comprising:
   searching a category database for at least one recommended category identifier corresponding to the goods identifier;
   providing the user with a list of at least one recommended category identifier based, at least in part, upon the searched recommended category identifier.

6. The method of claim 5, further comprising:
   receiving a category name of the goods for the online sale from the user; and
   extracting at least one keyword in association with a category name or a category identifier from the received category name,
   wherein the searching of the at least one recommended category identifier comprises:
   searching the category database for at least one recommendation category identifier corresponding to the goods identifier by using the extracted keyword.

7. The method of claim 5, further comprising:
   upon the user's selection of a category identifier, automatically correlating the received goods identifier to the selected category identifier.

8. The method of claim 5, further comprising:
   providing the user with a list of at least some of the category identifiers included in the category database; and
   upon the user's selection of a category identifier among the listed category identifiers, correlating the goods identifier to the selected category identifier.

9. A computer-implemented method that uses a computer processor to register goods for online sale, the method comprising:
   receiving a request for registration of goods for online sale, the request being indicative of a goods identifier or a category name of goods to be sold using an online shopping server from a user;
   upon receipt of the request for registration extracting a keyword in association with a category from the category name received from the user;
   searching, using the computer processor, a category database by using the extracted keyword for at least one recommended category identifier corresponding to the received category name wherein the category database comprises a plurality of category identifiers in association with a plurality of goods identifier; and
   providing the user with a list of recommended category identifiers based, at least in part, upon the searched recommended category identifier so that the user uses the provided list of the recommended category identifiers for their selection of a category identifier.

10. The method of claim 9, further comprising:
    upon the user's selection of a category identifier, automatically correlating the retrieved goods identifier to the selected category identifier.

11. A system for registering goods for online sale, the system comprising:
    a receiving unit configured to receive a request for registration of goods for online sale, the request being indicative of a goods identifier or a name of the goods to be sold using the online shopping server;

an extraction unit configured to extract at least one keyword in association with a model name of the goods from the goods name or the goods identifier, upon receipt of the request for registration;

a search unit configured to search a goods model database by using the extracted keyword for at least one recommended model identifier corresponding to the goods identifier or the goods name, wherein the goods model database comprises a plurality of model identifiers in association with a plurality of goods identifiers;

a non-transitory computer readable data storage medium to store the goods model database; and a presentation unit configured to provide the user with a list of recommended model identifiers based, at least in part, upon the searched recommended model identifier so that the user uses the provided list of the recommended model identifiers for their selection of a model identifier.

12. The system for registering goods for online sale of claim 11, further comprising:

a matching unit configured to automatically correlate the received goods identifier to the selected model identifier, upon the user's selection of a model identifier.

13. A system for registering goods for online sale, the system comprising:

a receiving unit configured to receive a request for registration of goods for online sale, the request being indicative of a goods identifier or a category name of goods to be sold using an online shopping server from a user;

an extraction unit configured to extract a keyword in association with a category from the category name received from the user, upon receipt of the request for registration;

a search unit configured to search a category database by using the extracted keyword for at least one recommended category identifier corresponding to the received category name, wherein the category database comprises a plurality of category identifiers in association with a plurality of goods identifier;

a non-transitory computer readable data storage medium to store the category database; and a presentation unit configured to provide the user with a list of recommended category identifiers based, at least in part, upon the searched recommended category identifier so that the user uses the provided list of the recommended category identifiers for their selection of a category identifier.

14. The system of claim 13, further comprising:

a matching unit configured to automatically correlate, upon the user's selection of a category identifier, the retrieved goods identifier to the selected category identifier.

15. A system for registering goods for online sale, the system comprising:

a receiving module configured to receive a request for registration of goods for online sale, the request being indicative of a goods identifier or a name of the goods to be sold using the online shopping server;

a extracting module configured to extract at least one keyword in association with a model name of the goods from the goods name or the goods identifier, upon receipt of the request for registration;

a searching module configured to search a goods model database by using the extracted keyword for at least one recommended model identifier corresponding to the goods identifier or the goods name, wherein the goods model database comprises a plurality of model identifiers in association with a plurality of goods identifiers;

a non-transitory computer readable data storage medium to store the goods model database; and a provision module configured to provide the user with a list of recommended model identifiers based, at least in part, upon the at least one recommended model identifier so that the user uses the provided list of the recommended model identifiers for their selection of at least one out of the list of the recommended model identifiers.

16. The system of claim 15, further comprising:

a correlating module configured to automatically correlate the received goods identifier to the selected model identifier, upon the user's selection of a model identifier.

* * * * *

UNITED STATES PATENT AND TRADEMARK OFFICE
CERTIFICATE OF CORRECTION

| | |
|---|---|
| PATENT NO. | : 8,224,706 B2 |
| APPLICATION NO. | : 11/914610 |
| DATED | : July 17, 2012 |
| INVENTOR(S) | : Hyang Cheol Lee et al. |

It is certified that error appears in the above-identified patent and that said Letters Patent is hereby corrected as shown below:

Cover sheet, left column, the Assignee's name is misspelled. The correct spelling should be NHN Business Platform Corporation, not NHHN Business Platform Corporation:

(73)  Assignee: "NHHN Business Platform Corporation, Seongnam-si (KR)", should
read -- NHN Business Platform Corporation, Seongnam-si (KR) --

Signed and Sealed this
Twenty-eighth Day of August, 2012

David J. Kappos
*Director of the United States Patent and Trademark Office*